(12) United States Patent
Hayakawa et al.

(10) Patent No.: US 11,285,901 B2
(45) Date of Patent: Mar. 29, 2022

(54) STEERING WHEEL

(71) Applicant: JOYSON SAFETY SYSTEMS JAPAN K.K., Tokyo (JP)

(72) Inventors: Shinji Hayakawa, Echi-gun (JP); Masaru Iwazato, Echi-gun (JP)

(73) Assignee: JOYSON SAFETY SYSTEMS JAPAN K.K., Tokyo (JP)

( * ) Notice: Subject to any disclaimer, the term of this patent is extended or adjusted under 35 U.S.C. 154(b) by 0 days.

(21) Appl. No.: 17/068,797

(22) Filed: Oct. 12, 2020

(65) Prior Publication Data
US 2021/0146870 A1 May 20, 2021

(30) Foreign Application Priority Data

Nov. 18, 2019 (JP) .............................. JP2019-208075

(51) Int. Cl.
*B60R 21/203* (2006.01)
(52) U.S. Cl.
CPC ................................ *B60R 21/2035* (2013.01)
(58) Field of Classification Search
CPC ........................... B60R 21/2035; B60R 21/203
See application file for complete search history.

(56) References Cited

U.S. PATENT DOCUMENTS

| | | | | |
|---|---|---|---|---|
| 6,276,711 B1 * | 8/2001 | Kurz | ................... | B60R 21/2035 280/728.2 |
| 6,412,812 B1 * | 7/2002 | Ford | ................... | B60R 21/2035 280/728.2 |
| 6,547,272 B1 * | 4/2003 | Klozik | ................ | B60R 21/2035 280/728.2 |
| 8,256,797 B2 * | 9/2012 | Sakurai | ............... | B60R 21/2037 280/731 |
| 8,342,567 B2 * | 1/2013 | Sasaki | ................. | B60R 21/2037 280/728.2 |
| 8,794,662 B2 * | 8/2014 | Ishii | ..................... | B60R 21/2037 280/731 |
| 9,195,257 B2 * | 11/2015 | Miyahara | ............ | B60R 21/2037 |
| 9,403,552 B2 * | 8/2016 | Onohara | ............. | B60R 21/2037 |
| 9,550,525 B2 * | 1/2017 | Ishii | ..................... | B60R 21/2037 |
| 10,406,975 B2 * | 9/2019 | Obayashi | ............... | B62D 7/222 |
| 10,899,302 B2 * | 1/2021 | Ishii | ..................... | B60R 21/2037 |
| 2010/0066062 A1 * | 3/2010 | Suzuki | ............... | B60R 21/2037 280/728.2 |
| 2010/0219621 A1 * | 9/2010 | Sasaki | .................... | B60Q 5/003 280/731 |

(Continued)

FOREIGN PATENT DOCUMENTS

| | | | | |
|---|---|---|---|---|
| CN | 112440920 A | * | 3/2021 | |
| DE | 19608213 A1 | * | 9/1996 | ......... B60R 21/2035 |

(Continued)

*Primary Examiner* — Nicole T Verley
(74) *Attorney, Agent, or Firm* — Foley & Lardner LLP

(57) ABSTRACT

An airbag device is moved toward mounting portions and pins are inserted into insertion holes. Slopes at the distal end of each pin come into contact with a locking bar, so that the locking bar rotates and enters a longitudinal groove. When the locking bar approaches a back surface of the longitudinal groove, the locking member is rotated by an urging force of the coil spring and enters lateral grooves. Thus, the airbag device is mounted on a steering wheel body.

21 Claims, 15 Drawing Sheets

(56) References Cited

U.S. PATENT DOCUMENTS

| | | | |
|---|---|---|---|
| 2011/0101650 A1* | 5/2011 | Nebel | B60Q 5/003 280/728.1 |
| 2012/0242064 A1* | 9/2012 | Weigand | B60R 21/2037 280/728.2 |
| 2013/0026741 A1* | 1/2013 | Onohara | B60R 21/2037 280/731 |
| 2013/0076011 A1* | 3/2013 | Umemura | B60Q 5/003 280/728.2 |
| 2014/0131982 A1* | 5/2014 | Ishii | B60R 21/2037 280/728.2 |
| 2016/0114752 A1* | 4/2016 | Banno | B60R 21/2165 280/728.2 |
| 2018/0029556 A1* | 2/2018 | Ishii | B60R 21/2037 |
| 2018/0134243 A1* | 5/2018 | Ishii | B60R 21/01 |
| 2020/0043679 A1* | 2/2020 | Nonoyama | B60R 21/2037 |
| 2020/0307493 A1* | 10/2020 | Nagata | B60R 21/2037 |
| 2020/0346605 A1* | 11/2020 | Hirota | B62D 7/222 |

FOREIGN PATENT DOCUMENTS

| | | | | |
|---|---|---|---|---|
| DE | 102012210820 A1 * | 1/2014 | | B60R 21/203 |
| EP | 0741063 A2 * | 11/1996 | | B60R 21/2035 |
| EP | 1400414 A2 * | 3/2004 | | B60Q 5/003 |
| FR | 2793199 A1 * | 11/2000 | | B60N 2/01533 |
| GB | 2390337 A * | 1/2004 | | B60R 21/2037 |
| JP | 2013209009 A * | 10/2013 | | |
| JP | 2015071402 A * | 4/2015 | | |
| JP | 2015-145173 A | 8/2015 | | |
| JP | 6222195 B2 * | 11/2017 | | |
| JP | 2018024410 A * | 2/2018 | | |
| JP | 6517028 B2 | 5/2019 | | |
| JP | 2019156346 A * | 9/2019 | | |
| JP | 2019189113 A * | 10/2019 | | B60R 21/2037 |
| JP | 2020019379 A * | 2/2020 | | B60R 21/2037 |
| KR | 20090070612 A * | 7/2009 | | |
| KR | 20210006316 A * | 1/2021 | | |
| WO | WO-9935011 A1 * | 7/1999 | | B60R 21/2035 |
| WO | WO-9944866 A1 * | 9/1999 | | B60R 21/2035 |
| WO | WO-2012032860 A1 * | 3/2012 | | B60R 21/2037 |
| WO | WO-2013077215 A1 * | 5/2013 | | B62D 1/10 |
| WO | WO-2016002507 A1 * | 1/2016 | | B62D 1/04 |
| WO | WO-2016042850 A1 * | 3/2016 | | B60Q 5/003 |
| WO | WO-2016/121274 A1 | 8/2016 | | |
| WO | WO-2016158503 A1 * | 10/2016 | | B60R 21/203 |
| WO | WO-2016166915 A1 * | 10/2016 | | B62D 1/04 |
| WO | WO-2021145150 A1 * | 12/2020 | | |
| WO | WO-2021001307 A1 * | 1/2021 | | B60R 21/203 |

* cited by examiner

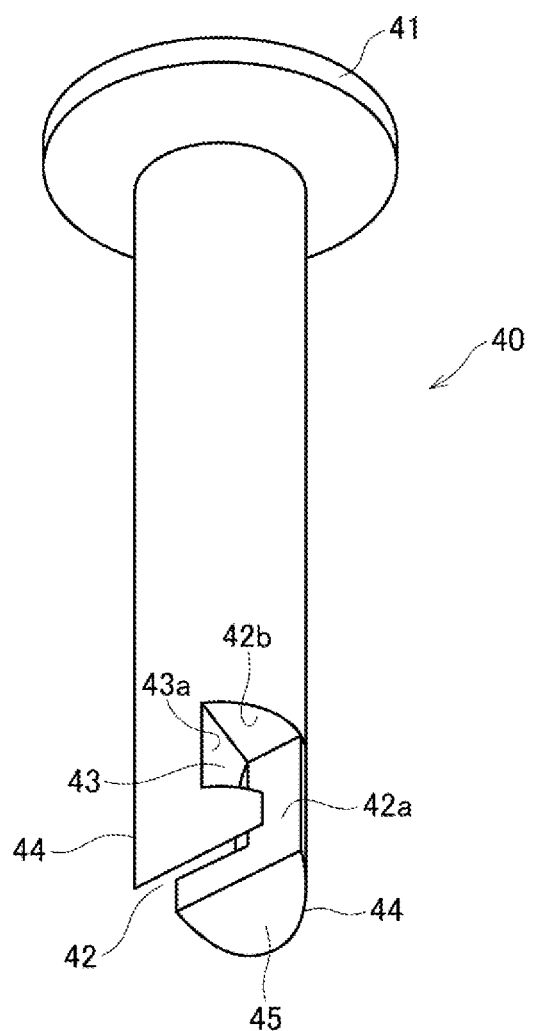

STEERING WHEEL

CROSS REFERENCE TO RELATED APPLICATION

This application is based upon and claims benefit of priority from the Japanese Patent Application No. 2019-208075, filed on Nov. 18, 2019, the entire contents of which are incorporated herein by reference.

TECHNICAL FIELD

The present invention relates to steering wheels, and in particular, relates to a steering wheel including a steering wheel body and an airbag device mounted on the steering wheel body.

BACKGROUND ART

PTL 1 (JP2015-145173A) discloses a related-art steering wheel incorporating an airbag device snap-in mounted on an airbag-device mounting unit.

As described in PTL 1, a pin protrudes from a rear surface of the airbag device and a free end of the pin is inserted into an insertion hole of the airbag-device mounting unit. The airbag-device mounting unit includes a locking spring (bending spring) on its rear surface. The pin includes a tapered portion at the free end. As the pin is inserted into the insertion hole, the locking spring moves along the tapered portion and is then fitted into a groove adjacent to the free end of the pin, so that the airbag device is mounted on the mounting unit.

PTL 1: JP2015-145173A

SUMMARY OF INVENTION

The present invention aims to provide a steering wheel configured such that, as a pin is inserted into an insertion hole in order to mount an airbag device on a mounting unit, a locking member is rotated and catches the distal end of the pin.

A steering wheel of the present invention includes a steering wheel body, an airbag-device mounting portion included in the steering wheel body, and an airbag device having a rear surface facing toward the airbag-device mounting portion and mounted on the airbag-device mounting portion. The steering wheel includes: a pin protruding from the rear surface of the airbag device; an engaging portion located adjacent to a distal end of the pin; an insertion hole located in the airbag-device mounting portion, the insertion hole receiving the pin; and a locking member located in the airbag-device mounting portion, the locking member including a locking portion in engagement with the engaging portion of the pin received in the insertion hole, wherein rotation of the locking member along a circumference of the insertion hole causes the locking portion to engage with the engaging portion of the pin.

In one embodiment of the present invention, the locking member is rotatable such that rotation in one direction along the circumference of the insertion hole causes the locking portion to engage with the engaging portion of the pin and rotation in an opposite direction to the one direction causes the locking portion to disengage from the engaging portion.

In one embodiment of the present invention, the steering wheel further includes a force component applying portion included in at least one of the distal end of the pin and the locking member. The force component applying portion applies a component of force to the locking member such that the locking member rotates in the opposite direction when the distal end of the pin comes into contact with the locking member during mounting of the airbag device on the steering wheel body.

In one embodiment of the present invention, the force component applying portion is a slope.

In one embodiment of the present invention, the steering wheel further includes an urges member integrated with or separate from the locking member. The urging member urges the locking member in an engagement direction.

In one embodiment of the present invention, the urging member is a coil spring.

In one embodiment of the present invention, the locking member includes a ring portion, the locking portion extending across a diameter of the ring portion or on a chord thereof, and an opening defined by the ring portion and the locking portion, the opening receiving a distal end portion of the pin. The engaging portion of the pin has a longitudinal groove extending from a distal end face of the pin toward a proximal end of the pin and having an open end adjacent to the distal end of the pin that allows the locking portion to enter the longitudinal groove; and a lateral groove extending from a part of the longitudinal groove that is adjacent to the proximal end of the pin and extending in a circumferential direction of the pin.

In one embodiment of the present invention, the locking portion is a locking bar extending across the diameter of the ring portion. The longitudinal groove extends in a diametrical direction of the distal end face of the pin. The lateral groove is located on each of a first half of a first side of the longitudinal groove and a second half of a second side thereof in the diametrical direction.

In one embodiment of the present invention, the force component applying portion is located in each of a portion of the distal end face of the pin that extends along the first half of the first side of the longitudinal groove in the diametrical direction and a portion of the distal end face of the pin that extends along the second half of the second side thereof.

In one embodiment of the present invention, the locking portion has an edge extending on the chord of the ring portion, and the longitudinal groove is shaped by cutting away a part of the distal end face at the chord.

In one embodiment of the present invention, the force component applying portion extends entirely along the longitudinal groove in the diametrical direction in the distal end face of the pin.

In one embodiment of the present invention, the pin has an axis aligned with that of the ring portion.

In one embodiment of the present invention, the pin has an axis offset from that of the ring portion.

In one embodiment of the present invention, the locking member has a rotatable plate, a central hole in the plate, and at least one protrusion protruding radially and inwardly from an inner circumferential surface of the central hole. The engaging portion of the pin has at least one longitudinal groove extending from the distal end of the pin toward a proximal end of the pin in a circumferential surface of the pin; and a lateral groove extending from a part of the longitudinal groove that is adjacent to the proximal end of the pin and extending in the circumferential surface of the pin in a circumferential direction of the pin. The protrusion passes through the longitudinal groove and engages with the lateral groove.

In one embodiment of the present invention, the at least one protrusion includes a plurality of protrusions spaced apart in the circumferential direction; the at least one longitudinal groove includes a plurality of longitudinal grooves spaced apart in the circumferential direction; and the plurality of protrusions are equal in number to the plurality of longitudinal grooves.

In one embodiment of the present invention, the locking member has a rotatable plate, a central hole in the plate, and at least one slot extending radially from the central hole. The pin includes a small-diameter portion located adjacent to the distal end, and at least one protrusion on a circumferential surface of the small-diameter portion. The force component applying portion is located in at least one of a radially extending wall surface of the slot and a tip of the protrusion. The small-diameter portion passes through the central hole, the protrusion passes through the slot, and the protrusion engages with an edge of the central hole.

In one embodiment of the present invention, the at least one slot includes a plurality of slots spaced apart in the circumferential direction. The at least one protrusion includes a plurality of protrusions spaced apart in the circumferential direction. The plurality of slots are equal in number to the plurality of protrusions.

In one embodiment of the present invention, the steering wheel further includes a holder holding the locking member such that the locking member is rotatable about an axis of the locking member.

In one embodiment of the present invention, the steering wheel further includes a bush fitted in the insertion hole of the airbag-device mounting portion such that the pin extends through the bush, wherein the holder is attached to the bush.

In one embodiment of the present invention, the holder includes a peripheral wall surrounding the locking member and the peripheral wall includes a projection attached to the bush.

In one embodiment of the present invention, the locking member includes a lug protruding radially and outwardly beyond the peripheral wall.

In one embodiment of the present invention, the urging member is disposed between an inner circumferential surface of the peripheral wall and an outer circumferential surface of the locking member.

Advantageous Effects of Invention

In the steering wheel according to the present invention, when the pin is inserted into the insertion hole of the mounting portion, the distal end of the pin comes into contact with the locking member. Contact portions of the pin and the locking member include a slope. The slope causes a force with which the pin is pressed into the insertion hole to be applied as a component of force in a rotation direction to the locking member, the locking member is rotated, and the pin is further pressed into the insertion hole, so that the locking portion of the locking member engages with the engaging portion of the pin. The urging member urges the locking member to maintain this engagement.

BRIEF DESCRIPTION OF DRAWINGS

FIG. 4 is a perspective view of a pin as viewed from below.

FIG. 5a is a perspective view illustrating the pin and a locking member that are to engage with each other and FIG. 5b is a cross-sectional view taken along line Vb-Vb in FIG. 5a.

DESCRIPTION OF EMBODIMENTS

A first embodiment will be described with reference to FIGS. 1 to 7.

Figure 1:
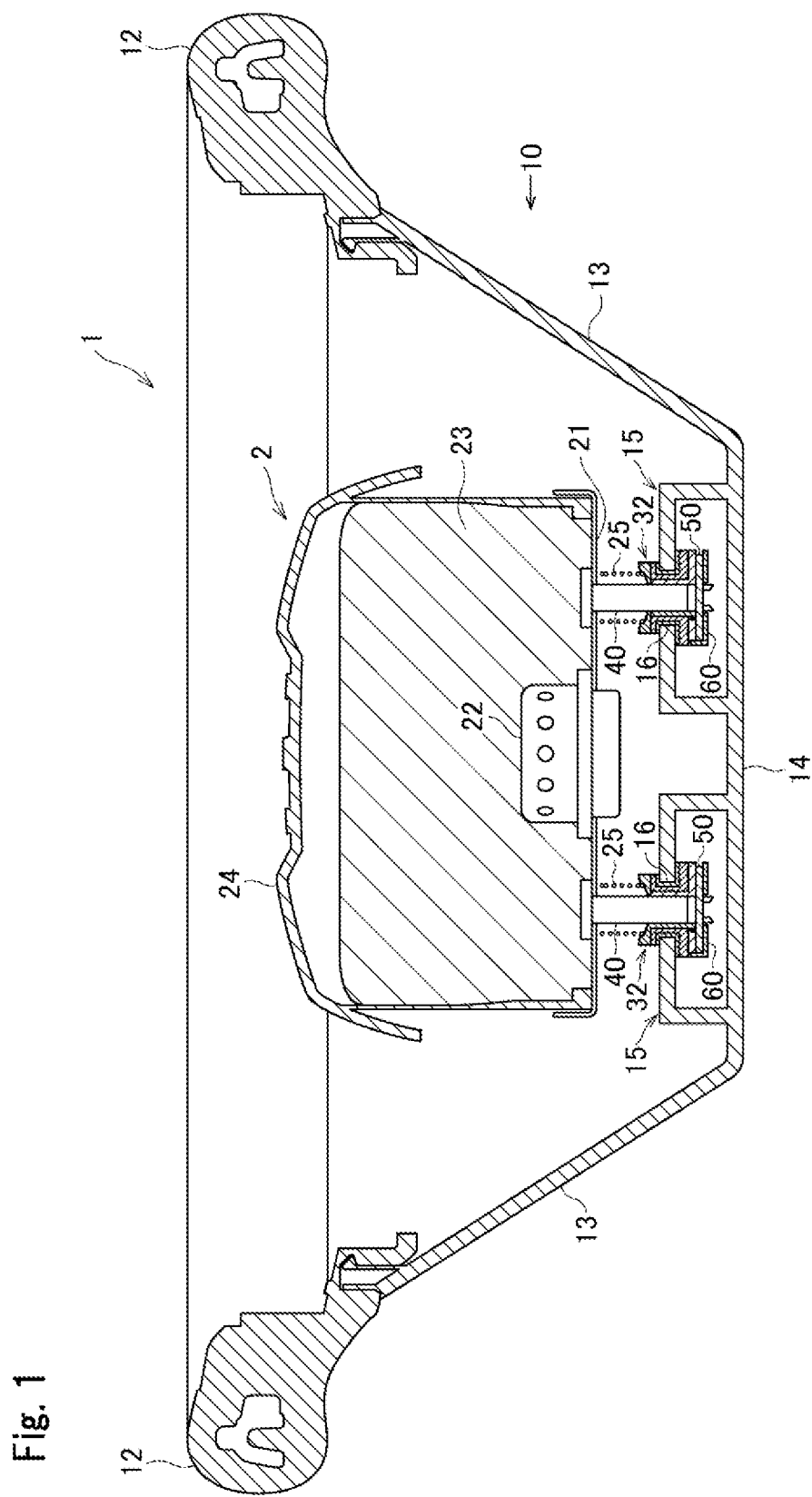
FIG. 1 is a sectional view of a steering wheel with an airbag device mounted thereon.
Figure 2:
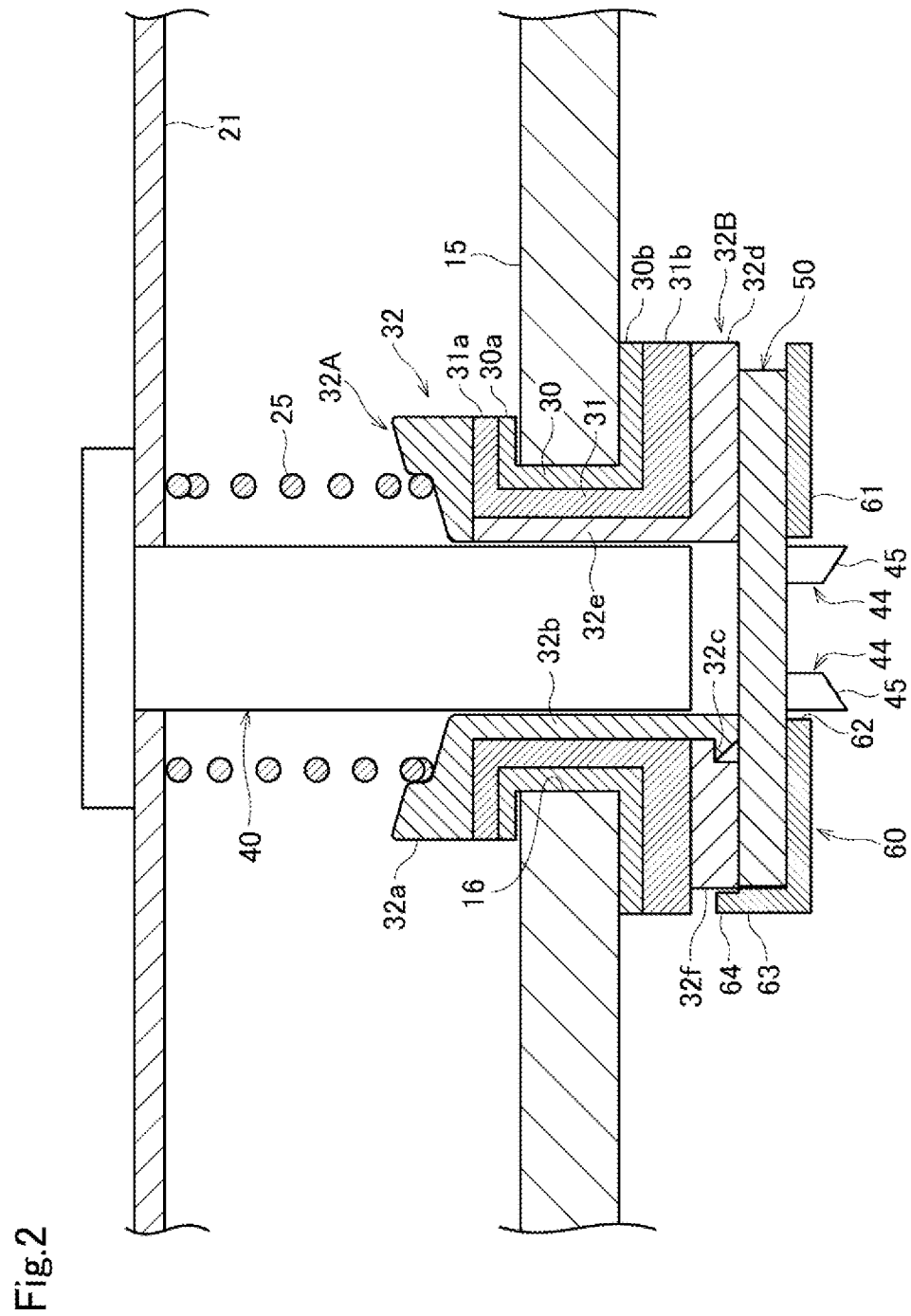
FIG. 2 is an enlarged sectional view of part in FIG. 1.

As illustrated in FIGS. 1 and 2, a steering wheel 1 includes a steering wheel body 10 and an airbag device 2 mounted on the steering wheel body. The steering wheel body 10 includes a wheel section 12, a spoke section 13, and a boss (metal core).

The boss 14 includes airbag-device mounting portions 15, insertion holes 16 arranged in the airbag-device mounting portions 15 for receiving pins 40, and holders 60 each holding a locking member 50.

As illustrated in FIG. 1, the airbag device 2 includes a retainer 21, an inflator 22 attached to the retainer 21, an airbag 23 attached to the retainer 21, a module cover 24 covering the airbag 23, multiple (in this embodiment, three) pins 40 protruding from the retainer 21, coil springs 25 each surrounding one of the pins 40 and urging the airbag device 2 in a direction away from the airbag-device mounting portions 15, and a horn switch plate (not illustrated). The pins 40 extend through the insertion holes 16.

The airbag 23 is folded and attached together with the inflator 22 to the retainer 21 by bolts (not illustrated). When the inflator 22 injects gas into the airbag 23 upon collision of a vehicle, the airbag 23 expands, causing the module cover 24 to split and open.

As enlarged and illustrated in FIG. 2, a guide column 32 is fitted in each of the insertion holes 16 such that bushes 30 and 31 are interposed between the guide column and the hole. Each bush 30 includes flanges 30a and 30b at opposite or upper and lower ends. Each bush 31 includes flanges 31a and 31b at opposite or upper and lower ends. These flanges are aligned with and placed on upper and lower edges of the insertion hole 16, so that the bushes 30 and 31 are fitted in the insertion hole 16. The guide column 32 is fitted in a hole of the bush 31.

Figure 3:
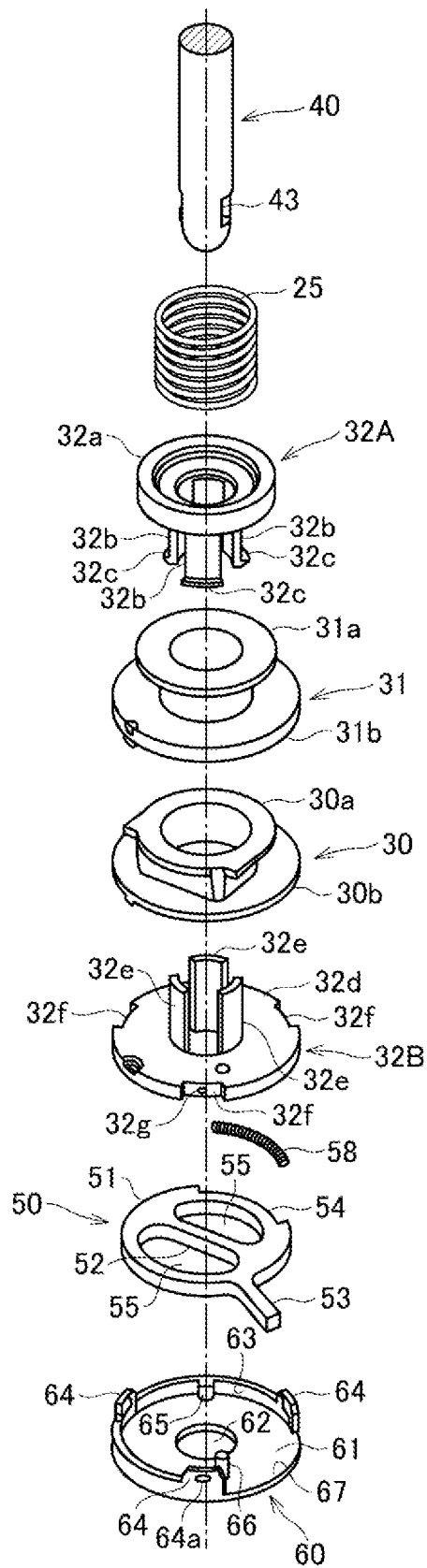
FIG. 3 is an exploded perspective view of an airbag-device mounting unit.

As illustrated in FIGS. 2 and 3, the guide column 32 is a combination of two segments, an upper guide-column segment 32A and a lower guide-column segment 32B. The upper guide-column segment 32A includes a flange 32a, three legs 32b extending from an inner circumference of the flange 32a, and claws 32c protruding from outer circumferential surfaces of the tips of the legs 32b.

The lower guide-column segment 32B includes a flange 32d and three legs 32e extending from an inner circumference of the flange 32d. The flange 32d has an outer circumferential surface having notches 32f to engage with projections 64 of the holder 60, which will be described later. The notches 32f each have a screw hole 32g.

The legs 32b of the upper guide-column segment 32A are inserted into the hole of the bush 31 through an upper end of the hole, and the legs 32e of the lower guide-column segment 32B are inserted into the hole of the bush 31 through a lower end of the hole. The legs 32b pass through spaces between the legs 32e and a hole in the flange 32d, and the claws 32c engage with the edge of the hole in the flange 32d, so that the upper guide-column segment 32A and the lower guide-column segment 32B are combined into the guide column 32. In such a state, the flanges 31a and 31b of the bush 31 are sandwiched between the flanges 32a and 32d.

Each pin 40 is inserted into a hole of the guide column 32.

As illustrated in FIGS. 4 to 7, the pin 40 includes a flange 41 at its proximal end (upper end) and has a longitudinal groove 42 in its distal end portion such that the longitudinal groove 42 extends in a diametrical direction across the distal end face of the pin. The longitudinal groove 42 is defined by wall surfaces 42a that are parallel to the diametrical direction and a back surface 42b. The width (distance between the wall surfaces 42a) of the longitudinal groove 42 is greater than a locking bar 52 of the locking member 50, which will be described later.

Figure 5A:
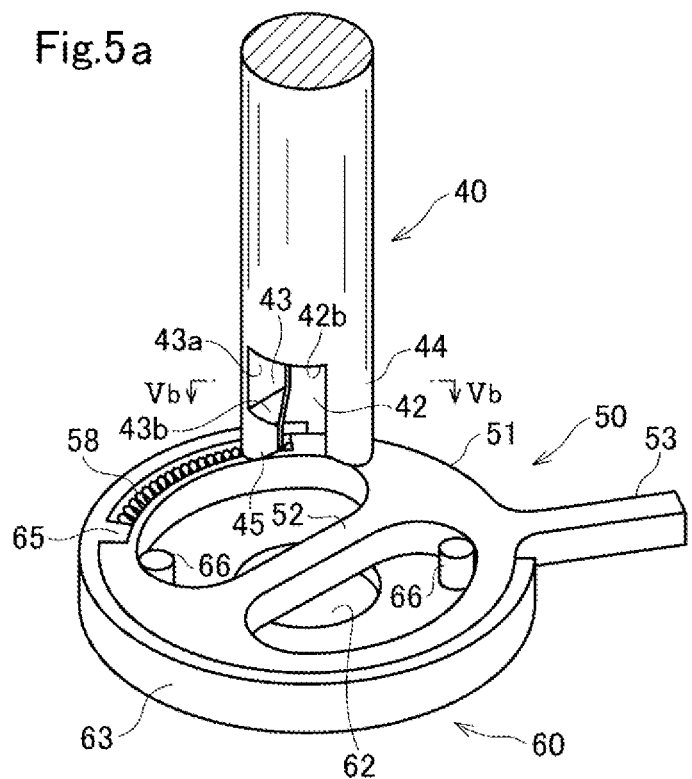
Figure 5B:
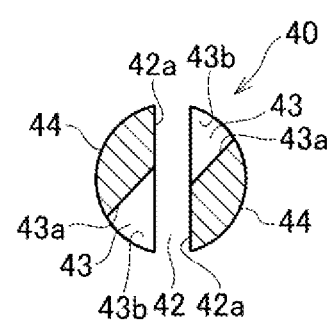
Figure 6:
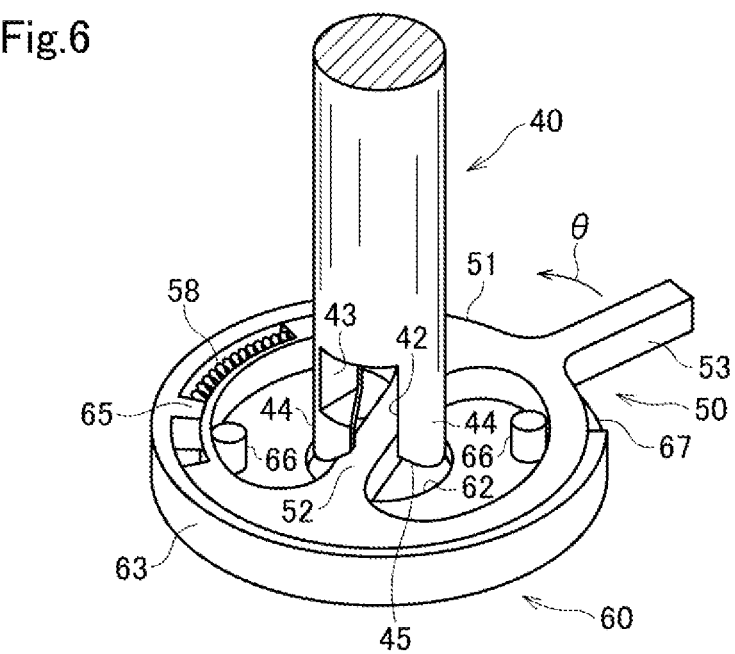
FIG. 6 is a perspective view illustrating the pin and the locking member that are to engage with each other.

A pair of lateral grooves 43 extend from the longitudinal groove 42 in a circumferential direction of the pin 40 and are located adjacent to the back (upper end in FIG. 4) of the longitudinal groove 42. One of the lateral grooves 43 is located on a first half of a first side of the longitudinal groove 42 in a longitudinal direction of the longitudinal groove 42 (or in the diametrical direction of the pin 40) and the other lateral groove 43 is located on a second half of a second side of the longitudinal groove 42. As illustrated in FIGS. 5a and 5b, the lateral grooves 43 are arranged in the wall surfaces 42a of the longitudinal groove 42 such that the lateral grooves 43 extend in the same direction (clockwise in FIGS. 5a and 5b) about the axis of the pin 40.

The lateral grooves 43 each have a wall surface 43a and a substantially triangular locking surface 43b that extends from the wall surface 43a to the longitudinal groove 42.

As illustrated in FIG. 5b, the wall surface 43a of one of the lateral grooves 43 is parallel to the wall surface 43a of the other lateral groove 43.

The distal end portion of the pin 40 is divided into a pair of substantially semicylindrical columnar parts 44 by the longitudinal groove 42. Each columnar part 44 has a free end having an end face that is a slope 45 extending from the circumference toward the proximal end of the pin 40 and sloping upwardly and inwardly to the longitudinal groove 42.

As illustrated in FIG. 3, the locking member 50, with which the distal end of the pin 40 is to engage, includes a substantially annular ring portion 51, the locking bar 52 as a locking portion extending diametrically across the ring portion 51, a lug 53 protruding substantially radially from the ring portion 51, and a notch 54 extending circumferentially in an outer circumferential surface of the ring portion 51. A coil spring 58 is disposed in the notch 54.

The locking bar 52 defines two substantially semicircular openings 55 in the ring portion 51.

The holder 60 for holding the locking member 50 has a circular plate 61, an opening 62 located in central part of the plate 61, a peripheral wall 63 extending from an outer circumference of the plate 61, the projections 64 projecting from the peripheral wall 63 in the same direction as that in which the peripheral wall extends and located at different (in this embodiment, three) positions in a circumferential direction of the peripheral wall 63, small holes 64a (FIG. 3) arranged in the respective projections 64, a stopper 65 protruding inwardly from an inner circumferential surface of the peripheral wall 63, a protrusion 66 protruding from the plate 61 in the same direction as that in which the peripheral wall 63 extends, and a passage 67, which is formed by cutting away a part of the peripheral wall 63, for the lug 53. The depiction of the projections 64 is omitted in FIGS. 5a, 6, and 7.

The protrusion 66 and the stopper 65 are located on opposite sides of the opening 62.

The locking member 50 is slidably fitted in the peripheral wall 63. In such a fitted state, the stopper 65 is located at one end of the notch 54 in a longitudinal direction of the notch 54, and the lug 53 outwardly extends through the passage 67 for the lug 53. The protrusion 66 is located in the opening 55.

Furthermore, in this state, the coil spring 58 storing force (or slightly compressed) is disposed between the other end of the notch 54 in the longitudinal direction of the notch 54 and the stopper 65 such that the locking member 50 is urged clockwise in FIGS. 3 and 5 to 7 (in a direction opposite to that of an arrow θ in FIG. 6) and the lug 53 is pressed against an end face of the peripheral wall 63 adjacent to the passage 67.

The holder 60 holding the locking member 50 is aligned with and placed on the flange 32d of the lower guide-column segment 32B such that the projections 64 engage with the notches 32f in the outer circumferential surface of the flange 32d of the lower guide-column segment 32B, and screws (not illustrated) are inserted into and fastened to the screw holes 32g through the small holes 64a, thus combining the locking member 50, the holder 60, and the lower guide-column segment 32B.

To mount the airbag device 2 on the steering wheel body 10, each pin 40 with the coil spring 25 fitted therearound is aligned with the insertion hole 16, the airbag device 2 is moved toward the airbag-device mounting portions 15, and the pins 40 are inserted into the respective insertion holes 16.

As each pin 40 is moved in an insertion direction, the slopes 45 at the distal end of the pin come into contact with the locking bar 52. As the pin 40 is further moved, the slopes 45 apply components of force in the direction of the arrow θ in FIG. 6 to the locking bar 52, so that the locking member 50 is rotated in the θ direction. The locking bar 52 is aligned with the longitudinal groove 42 and thus enters the longitudinal groove 42.

The rotation of the locking member 50 in the θ direction compresses the coil spring 58.

Figure 7:
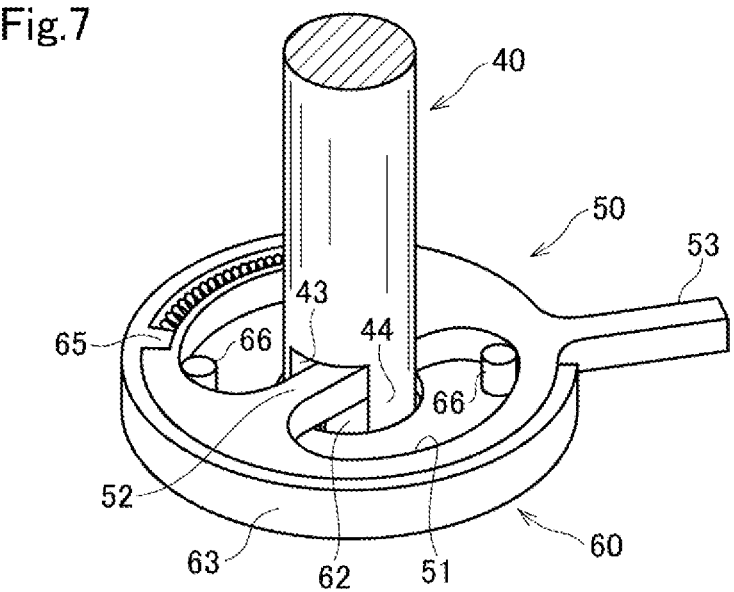
FIG. 7 is a perspective view illustrating the pin and the locking member in engagement with each other.
Figure 8:
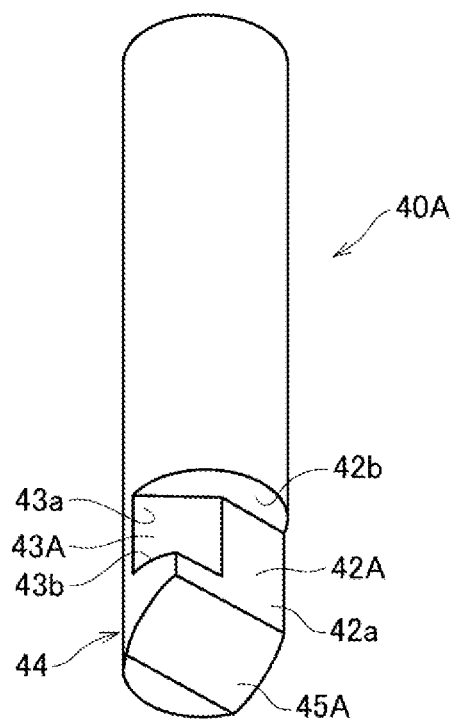
FIG. 8 is a perspective view of a pin as viewed from below.
Figure 9:
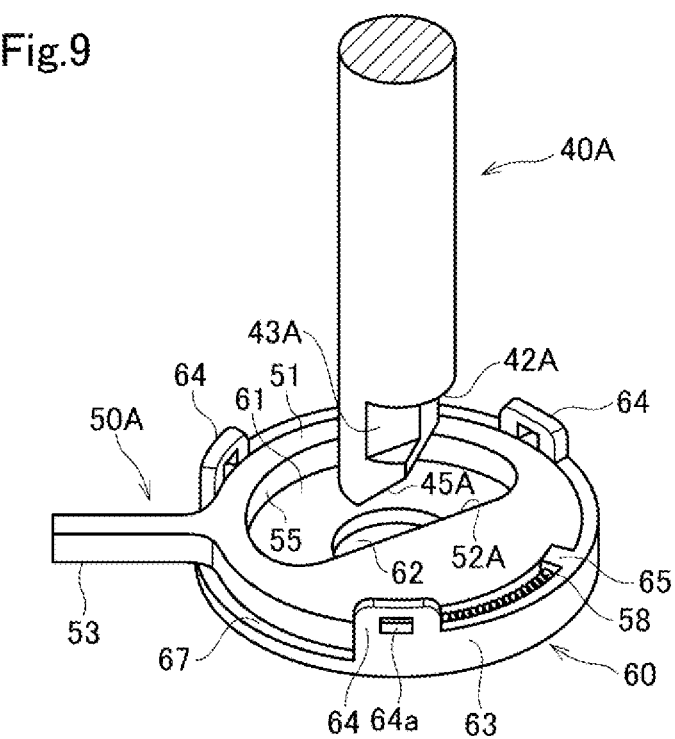
FIG. 9 is a perspective view illustrating the pin and a locking member that are to engage with each other.

When the locking bar 52 approaches the back surface 42b of the longitudinal groove 42, the locking member 50 is rotated in a direction opposite to the θ direction by an urging force of the coil spring 58. Thus, as illustrated in FIG. 7, the locking bar 52 enters the lateral grooves 43 and overlaps the locking surfaces 43b. This arrangement prevents the pin 40 from separating from the insertion hole 16. The airbag device 2 is mounted on the steering wheel body 10.

In a mounted state (locked state) of FIG. 7, pressing the lug 53 in the θ direction allows the locking bar 52 to leave the lateral grooves 43 and move to the longitudinal groove 42, thus removing the airbag device 2 from the airbag-device mounting portion 15.

A second embodiment will now be described with reference to FIGS. 8 to 11. In contrast to the first embodiment, a pin 40A in the second embodiment includes a single columnar part 44 and has a single lateral groove 43A.

In this embodiment, a longitudinal groove 42A is a longitudinal recess formed by cutting away a part of a distal end portion of the pin 40A at a chord. A wall surface 42a extends on the chord. The lateral groove 43A is a lateral recess formed by cutting away a part of the wall surface 42a and the part extends from substantially the middle of the chord to an outer circumferential surface of the pin 40A.

The distal end face of the columnar part 44 has a slope 45A extending to the wall surface 42a toward the proximal end of the pin 40A.

A locking member 50A has a substantially semicircular opening 55 located on a first side of a locking bar 52A, and a portion of the locking member 50A located on a second side of the locking bar 52A is plate-shaped.

The rest of the configuration in the second embodiment is the same as that in the first embodiment, and the other reference signs in FIGS. 8 to 11 designate the same components and parts as those in the first embodiment.

Figure 10:
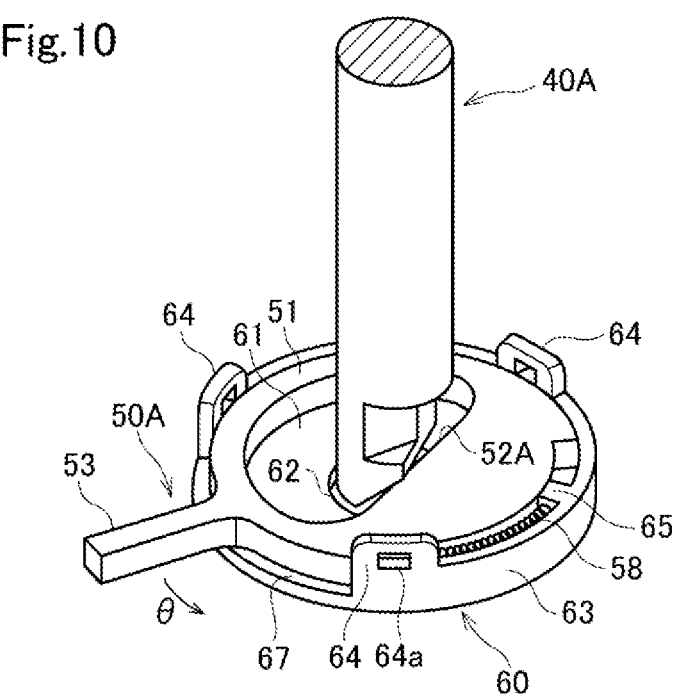
FIG. 10 is a perspective view illustrating the pin and the locking member that are to engage with each other.

To attach the airbag device to the mounting portions 15 in the second embodiment, each pin 40A is inserted into the opening 62 through the opening 55 of the locking member 50A. While the pin is being inserted, as illustrated in FIG. 10, the slope 45A comes into contact with the locking bar 52A. The locking member 50A is rotated in the θ direction by a component of force applied from the slope 45A, so that the coil spring 58 is compressed.

Figure 11:
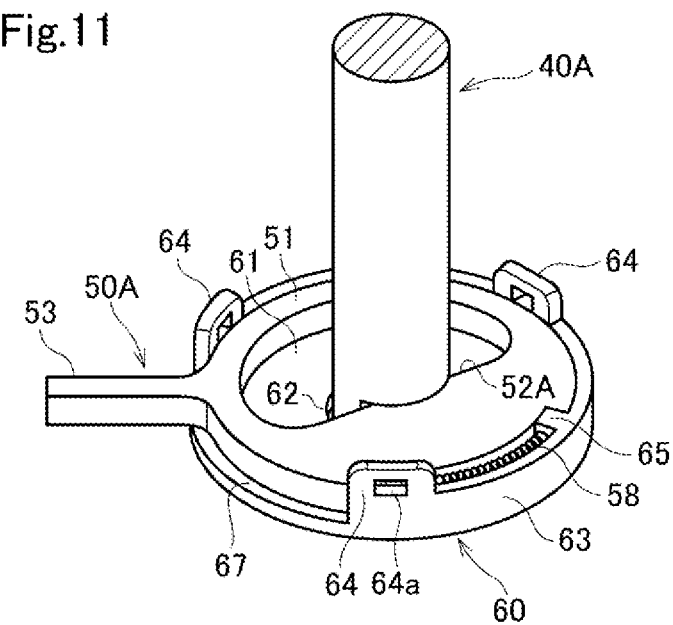
FIG. 11 is a perspective view illustrating the pin and the locking member in engagement with each other.

When the locking bar 52A enters the innermost part of the longitudinal groove 42A, the locking member 50A is rotated in the direction opposite to the θ direction by an urging force of the coil spring 58. Thus, as illustrated in FIG. 11, the locking bar 52A enters the lateral groove 43A. This arrangement prevents the pin 40A from separating from the locking member 50A. The airbag device is mounted on the steering wheel body.

In this embodiment, similarly, moving the lug 53 in the θ direction allows the pin 40A to separate from the locking member 50A.

Figure 12:
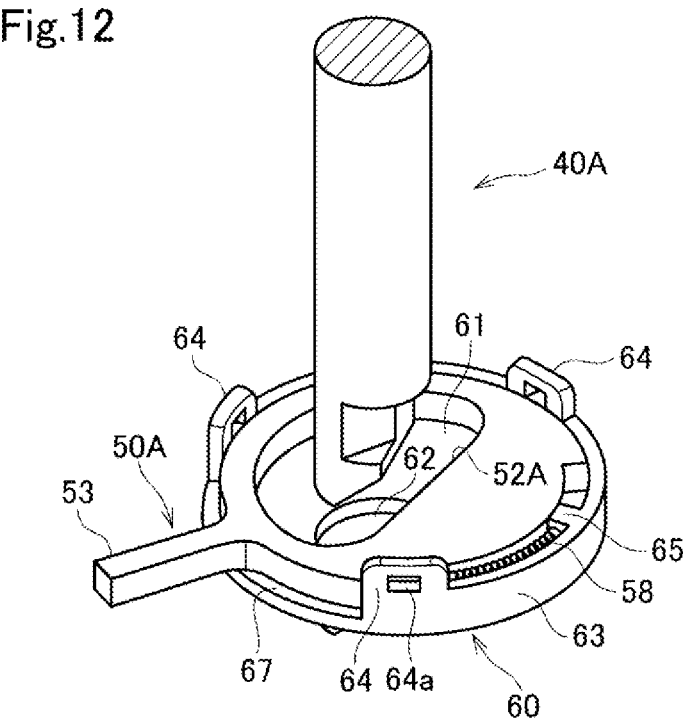
FIG. 12 is a perspective view illustrating the pin and a locking member that are to engage with each other.
Figure 13:
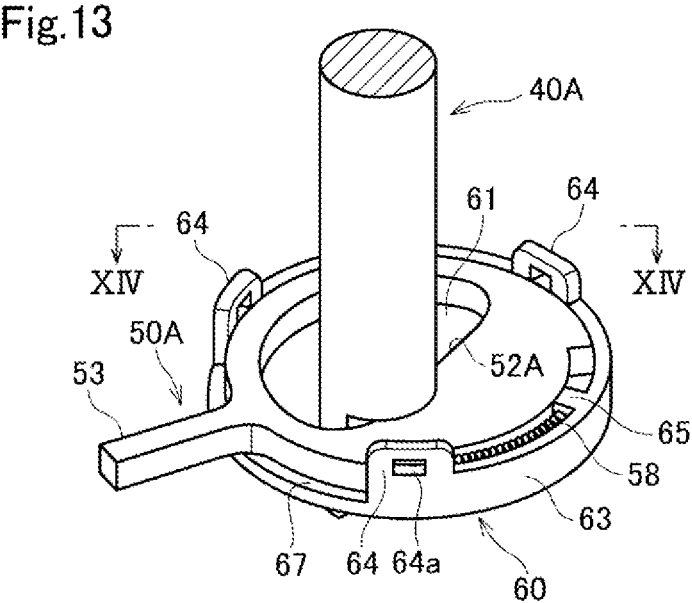
FIG. 13 is a perspective view illustrating the pin and the locking member in engagement with each other.
Figure 14:
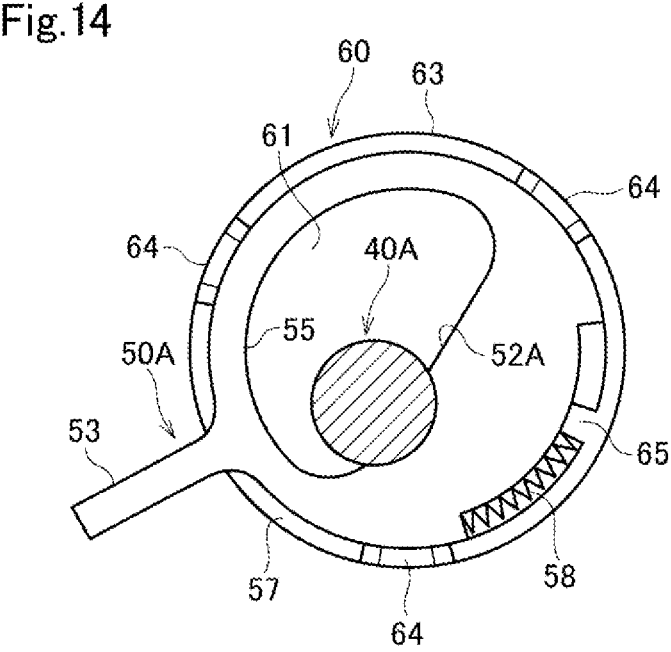
FIG. 14 is a cross-sectional view taken along line XIV-XIV in FIG. 13.

Although the opening 62 is located at the center of the plate 61 in FIGS. 8 to 11, the opening 62 may be located at a position offset from the center of the plate 61, as in a third embodiment illustrated in FIGS. 12 to 14. The rest of the configuration in the embodiment in FIGS. 12 to 14 is the same as that in the embodiment in FIGS. 8 to 11, and the same reference signs designate the same components and parts.

A fourth embodiment will now be described with reference to FIGS. 15 to 18.

Figure 15:
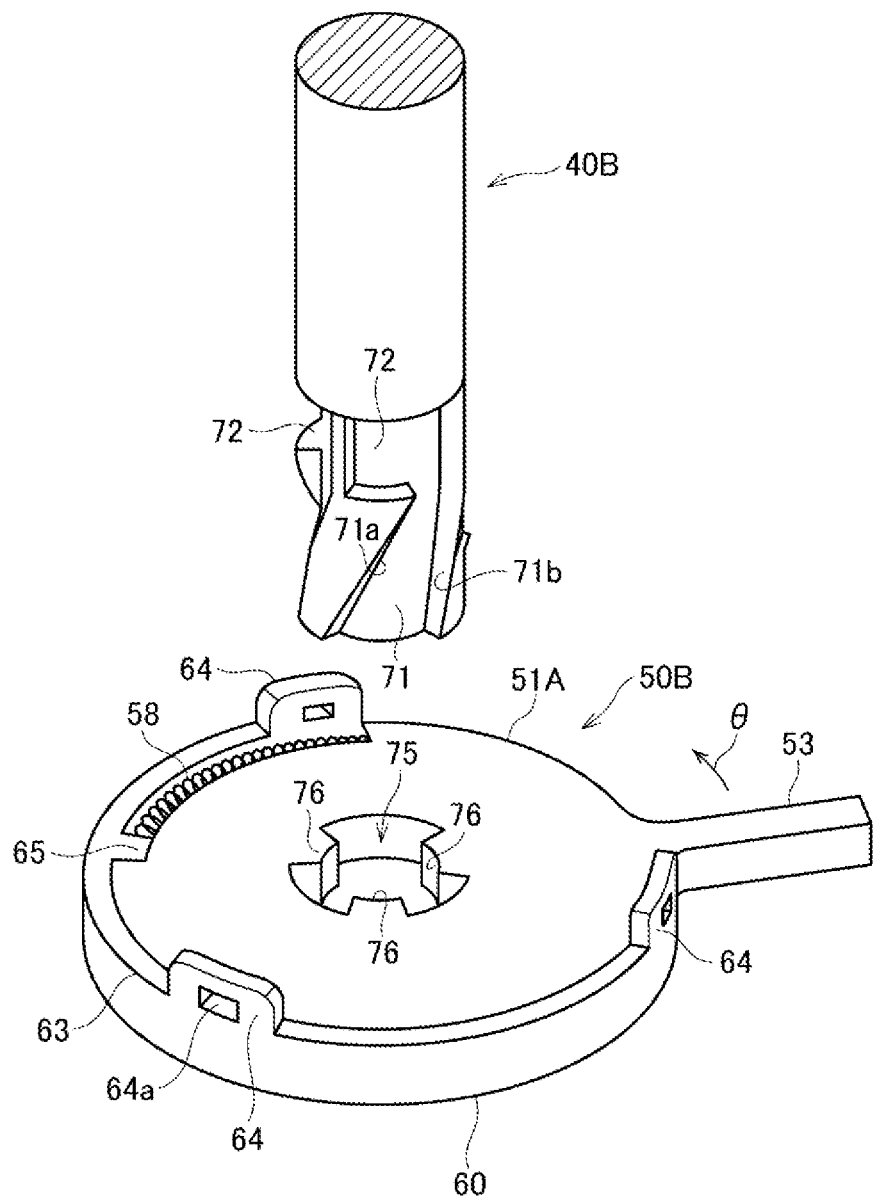
FIG. 15 is a perspective view illustrating a pin and a locking member that are to engage with each other.
Figure 16:
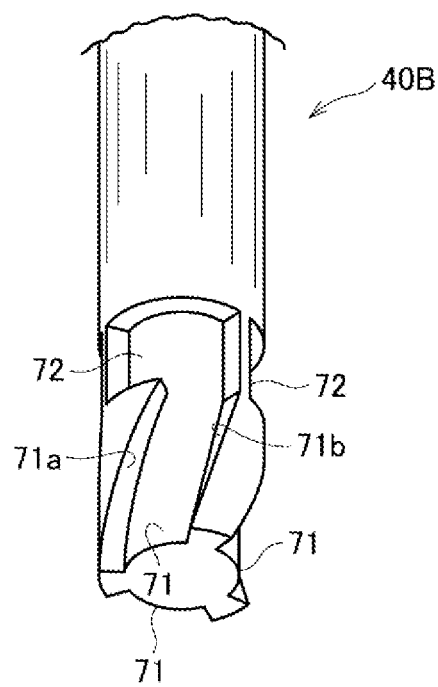
FIG. 16 is a perspective view of the pin as viewed from below.
Figure 17:
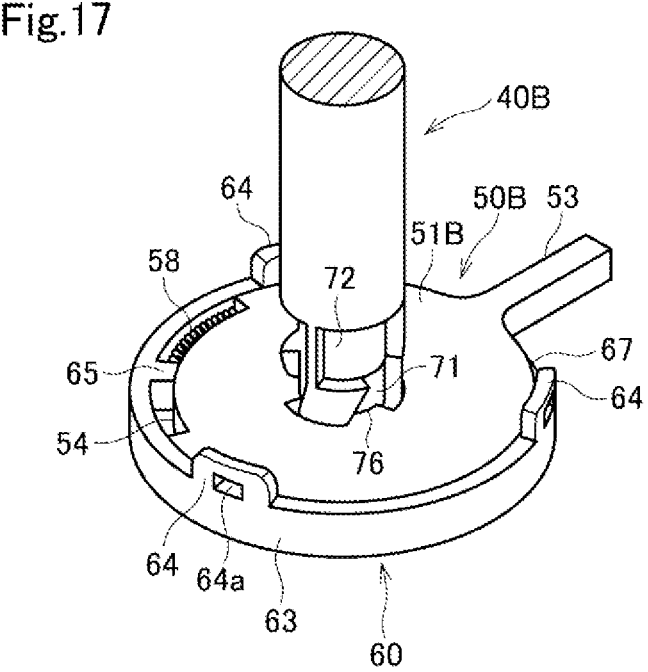
FIG. 17 is a perspective view illustrating the pin and the locking member that are to engage with each other.
Figure 18:
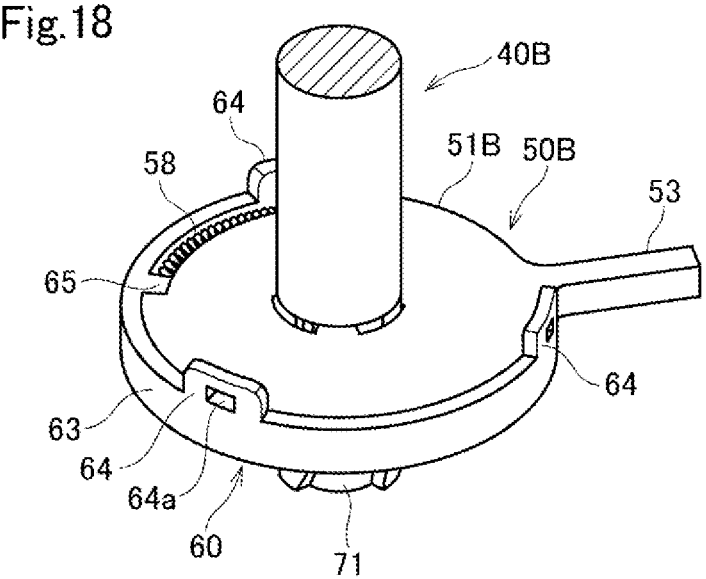
FIG. 18 is a perspective view illustrating the pin and the locking member in engagement with each other.

FIG. 15 is an exploded perspective view illustrating an engagement relationship between a pin 40B and a locking member 50B in this embodiment. FIG. 16 is a perspective view of the pin 40B as viewed from the side where the distal end of the pin is located.

The pin 40B has three longitudinal grooves 71 arranged in its outer circumferential surface adjacent to the distal end and extending from the distal end in the longitudinal direction of the pin. The longitudinal grooves 71 are arranged at regular intervals in a circumferential direction of the pin.

A lateral groove 72 extends from one end of each longitudinal groove 71 (adjacent to the proximal end of the pin 40B) such that the lateral groove 72 extends in the circumferential direction of the pin 40B. Thus, the longitudinal groove 71 and the lateral groove 72 constitute an L-shaped keyway.

Each longitudinal groove 71 has a pair of wall surfaces 71a and 71b. The wall surfaces 71a and 71b extend inwardly from the outer circumferential surface of the pin 40B. The width of the longitudinal groove 71, or the distance between the wall surfaces 71a and 71b, increases toward the distal end of the pin 40B.

The wall surfaces 71a and 71b are slopes at an angle to lines parallel to the axis of the pin 40B. In other words, the longitudinal groove 71 extends angularly clockwise toward the proximal end of the pin 40B.

The lateral grooves 72 extend from the respective longitudinal grooves 71, which extend from the distal end of the pin 40B toward the proximal end thereof, in the same direction along the circumference of the pin.

The pin 40B is inserted into a central hole 75 of the locking member 50B. The central hole 75 has an inner circumferential surface having three protrusions 76 protruding radially and inwardly therefrom. The protrusions 76 have a width (width along the circumference of the central hole 75) that can pass through the narrowest space between the wall surfaces 71a and 71b.

The rest of the configuration in the fourth embodiment is the same as that in the first embodiment, and the other reference signs designate the same components and parts as those in the first embodiment.

To attach the airbag device to the mounting portions 15 in the fourth embodiment, each pin 40B is inserted into the central hole 75. Then, the protrusions 76 come into contact with the wall surfaces 71a. The wall surfaces 71a apply components of force to the locking member 50B such that the locking member 50B is rotated in the θ direction, so that the coil spring 58 is compressed. When the protrusions 76 enter the innermost parts of the respective longitudinal grooves 71, the locking member 50B is rotated in the direction opposite to the θ direction by an urging force of the coil spring 58, so that the protrusions 76 enter the respective lateral grooves 72. This arrangement prevents the pin 40B from separating from the locking member 50B. The airbag device is mounted on the steering wheel body.

In this embodiment, similarly, moving the lug 53 in the θ direction allows the pin 40B to separate from the central hole 75.

A fifth embodiment will now be described with reference to FIGS. 19 to 24.

Figure 19:
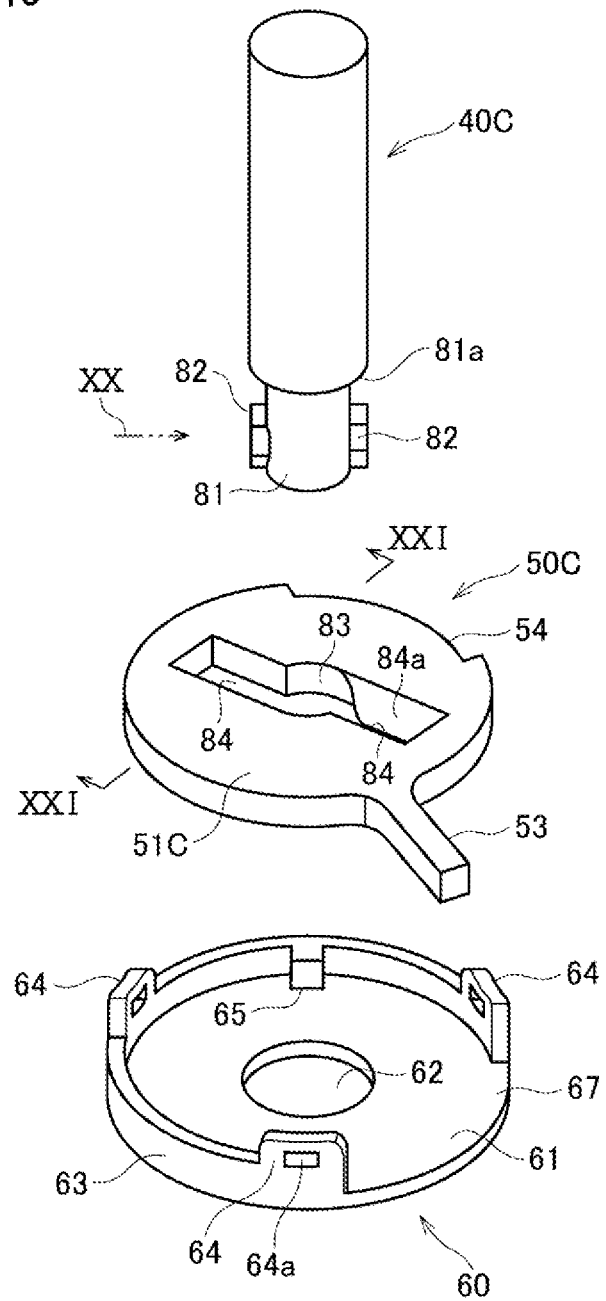
FIG. 19 is a perspective view illustrating a pin and a locking member that are to engage with each other.
Figure 20:
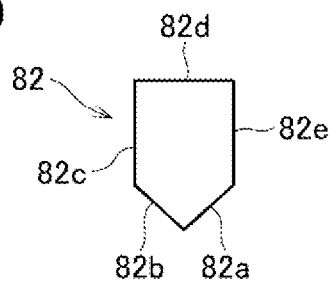
FIG. 20 is a plan view as viewed in a direction of arrow XX in FIG. 19.
Figure 21:
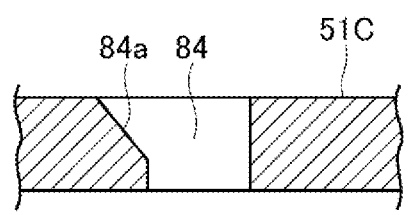
FIG. 21 is a sectional view of part of the locking member taken along line XXI-XXI in FIG. 19.
Figure 22:
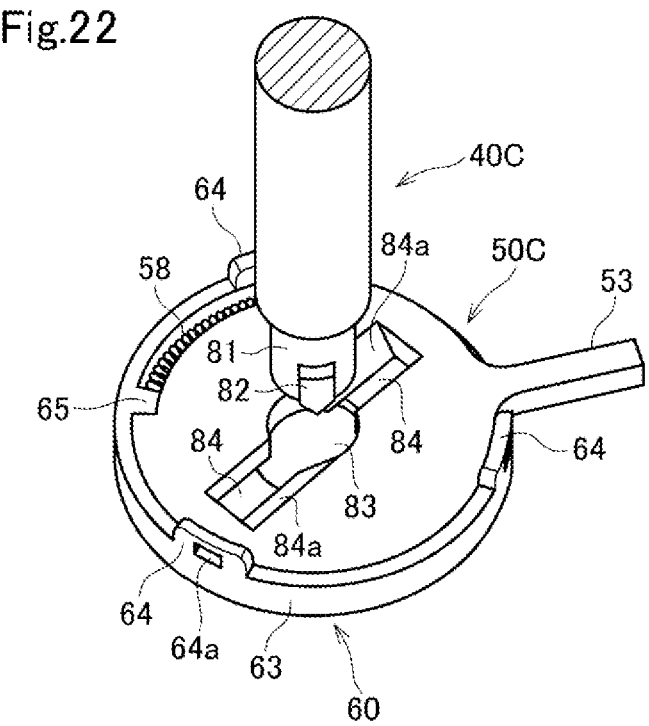
FIG. 22 is a perspective view illustrating the pin and the locking member that are to engage with each other.
Figure 23:
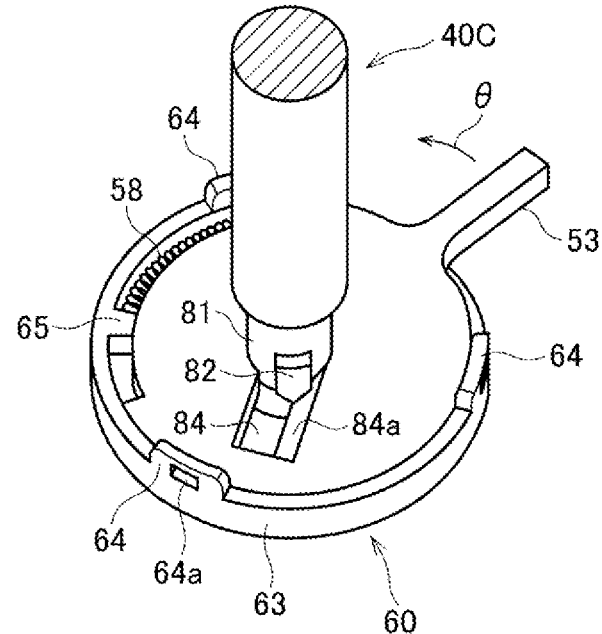
FIG. 23 is a perspective view illustrating the pin and the locking member that are to engage with each other.
Figure 24:
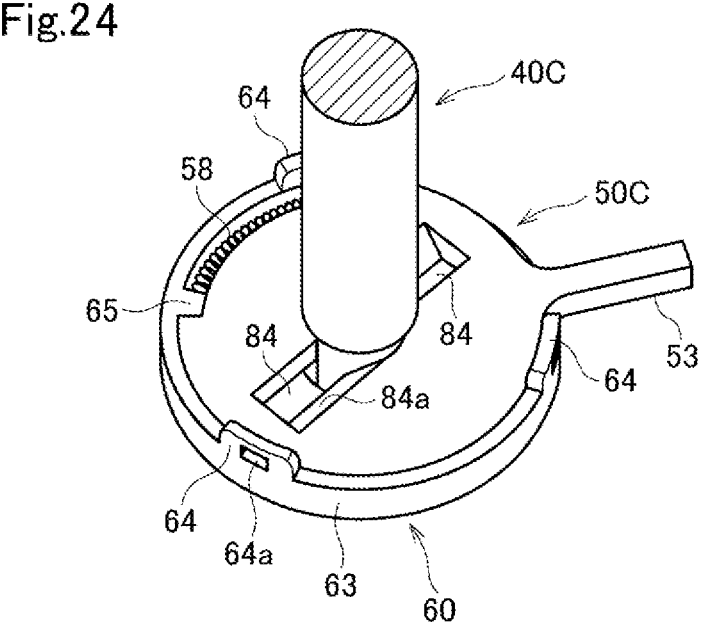
FIG. 24 is a perspective view illustrating the pin and the locking member in engagement with each other.

FIG. 19 is an exploded perspective view illustrating an engagement relationship between a pin 40C, a locking member 50C, and the holder 60 in this embodiment. FIG. 20 is a plan view illustrating the shape of a protrusion as viewed in a direction of arrow XX in FIG. 19. FIG. 21 is an enlarged sectional view illustrating a sectional shape of a slot taken along line XXI-XXI in FIG. 19. FIGS. 22 to 24 are perspective views illustrating an engagement relationship between the pin 40C and the locking member 50C.

The pin 40C includes a substantially cylindrical small-diameter portion 81 adjacent to its distal end, a large-diameter portion located on the small-diameter portion 81 (or adjacent to the proximal end of the pin), and a shoulder 81a at the boundary between these portions.

The small-diameter portion 81 has two protrusions 82 at diametrically opposite locations on its circumferential surface. As illustrated in FIG. 20, each protrusion 82 has a pentagonal shape having five sides 82a to 82e and a tip pointing downward (or toward the distal end of the pin). The protrusion 82 has slopes 82a and 82b meeting each other to define a V-shaped ridge at the tip.

The small-diameter portion 81 of the pin 40C is inserted into a central hole 83 of the locking member 50C. The locking member 50C includes a disc 51C. The disc 51C has the central hole 83 at its center.

A pair of slots 84 extend radially from the central hole 83 in opposite directions. As illustrated in FIG. 21, one of radially extending side surfaces of each slot 84 has a slope 84a.

Like the locking member 50, the locking member 50C has the lug 53 and the notch 54.

The holder 60 for holding the locking member 50C has the same shape as that in the first embodiment. The coil spring 58 disposed in the notch 54 urges the locking member 50C in the direction opposite to that of the arrow θ (counter-θ direction).

The rest of the configuration in the fifth embodiment is the same as that in the first embodiment, and the other reference signs designate the same components and parts as those in the first embodiment.

To attach the airbag device to the mounting portions 15 in the fifth embodiment, each pin 40C is inserted into the central hole 83. Then, the slopes 82a of the protrusions 82 come into contact with the slopes 84a. As the pin 40C is further pressed into the central hole 83, the locking member 50C is rotated in the θ direction with components of force applied by sliding of the slopes 82a and 84a, so that the coil spring 58 is compressed. Upon passing of the upper sides 82d of the protrusions 82 through the slots 84, the locking member 50C is rotated in the counter-θ direction by an urging force of the coil spring 58, so that the protrusions 82 are fitted to a lower edge of the central hole 83 of the disc 51C as illustrated in FIG. 24. This arrangement prevents the pin 40C from separating from the locking member 50C. The airbag device is mounted on the steering wheel body.

In this embodiment, similarly, moving the lug 53 in the θ direction allows the pin 40C to separate from the locking member 50C.

Although the two protrusions 82 and the two slots 84 are arranged in FIGS. 19 to 24, each of the number of protrusions and the number of slots may be one or three or more.

Although the protrusions 82 and the slots 84 each have a slope in FIGS. 19 to 24, either the protrusions or the slots may have a slope.

The above-described embodiments are examples of the present invention. The present invention may take the form other than those illustrated in the drawings. For example, a force component applying portion that takes the form other than a slope may be disposed. Furthermore, the locking member and the urging member may be integrated into a single member.

Although the pins have the slopes in the above-described first to fourth embodiments, the locking members may have slopes. Furthermore, the pins and the locking members may have slopes.

The invention claimed is:

1. A steering wheel including a steering wheel body, an airbag-device mounting portion included in the steering wheel body, and an airbag device having a rear surface facing toward the airbag-device mounting portion and mounted on the airbag-device mounting portion, the steering wheel comprising:
    a pin protruding from the rear surface of the airbag device;
    an engaging portion located adjacent to a distal end of the pin;
    an insertion hole located in the airbag-device mounting portion, the insertion hole receiving the pin; and
    a locking member located in the airbag-device mounting portion, the locking member including a locking portion in engagement with the engaging portion of the pin received in the insertion hole,
    wherein rotation of the locking member along a circumference of the insertion hole causes the locking portion to engage with the engaging portion of the pin, and,
    a force component applying portion included in at least one of the distal end of the pin and the locking member, the force component applying portion applying a component of force to the locking member such that the locking member rotates in the opposite direction when the distal end of the pin comes into contact with the locking member during mounting of the airbag device on the steering wheel body.

2. The steering wheel according to claim 1, wherein the locking member is rotatable such that rotation in one direction along the circumference of the insertion hole causes the locking portion to engage with the engaging portion of the pin and rotation in an opposite direction to the one direction causes the locking portion to disengage from the engaging portion.

3. The steering wheel according to claim 1, wherein the force component applying portion is a slope.

4. The steering wheel according to claim 1, further comprising:
    an urging member integrated with or separate from the locking member, the urging member urging the locking member in an engagement direction.

5. The steering wheel according to claim 4, wherein the urging member is a coil spring.

6. The steering wheel according to claim 1,
    wherein the locking member has
        a rotatable plate,
        a central hole in the plate, and
        at least one protrusion protruding radially and inwardly from an inner circumferential surface of the central hole,
    wherein the engaging portion of the pin has
        at least one longitudinal groove extending from the distal end of the pin toward a proximal end of the pin in a circumferential surface of the pin, and
        a lateral groove extending from a part of the longitudinal groove that is adjacent to the proximal end of the pin and extending in the circumferential surface of the pin in a circumferential direction of the pin, and wherein the protrusion passes through the longitudinal groove and engages with the lateral groove.

7. The steering wheel according to claim 6, wherein the at least one protrusion comprises a plurality of protrusions spaced apart in the circumferential direction, the at least one longitudinal groove comprises a plurality of longitudinal grooves spaced apart in the circumferential direction, and the plurality of protrusions are equal in number to the plurality of longitudinal grooves.

8. The steering wheel according to claim 1,
wherein the locking member has
a rotatable plate,
a central hole in the plate, and
at least one slot extending radially from the central hole,
wherein the pin includes
a small-diameter portion located adjacent to the distal end, and
at least one protrusion on a circumferential surface of the small-diameter portion,
wherein the force component applying portion is located in at least one of a radially extending wall surface of the slot and a tip of the protrusion, and
wherein the small-diameter portion passes through the central hole, the protrusion passes through the slot, and the protrusion engages with an edge of the central hole.

9. The steering wheel according to claim 8, wherein the at least one slot comprises a plurality of slots spaced apart in the circumferential direction, the at least one protrusion comprises a plurality of protrusions spaced apart in the circumferential direction, and the plurality of slots are equal in number to the plurality of protrusions.

10. The steering wheel according to claim 1, further comprising:
a holder holding the locking member such that the locking member is rotatable about an axis of the locking member.

11. The steering wheel according to claim 10, further comprising:
a bush fitted in the insertion hole of the airbag-device mounting portion such that the pin extends through the bush,
wherein the holder is attached to the bush.

12. A steering wheel including a steering wheel body, an airbag-device mounting portion included in the steering wheel body, and an airbag device having a rear surface facing toward the airbag-device mounting portion and mounted on the airbag-device mounting portion, the steering wheel comprising:
a pin protruding from the rear surface of the airbag device;
an engaging portion located adjacent to a distal end of the pin;
an insertion hole located in the airbag-device mounting portion, the insertion hole receiving the pin; and
a locking member located in the airbag-device mounting portion, the locking member including a locking portion in engagement with the engaging portion of the pin received in the insertion hole,
wherein rotation of the locking member along a circumference of the insertion hole causes the locking portion to engage with the engaging portion of the pin,
wherein the locking member includes
a ring portion,
the locking portion extending across a diameter of the ring portion or on a chord thereof, and
an opening defined by the ring portion and the locking portion, the opening receiving a distal end portion of the pin, and
wherein the engaging portion of the pin has
a longitudinal groove extending from a distal end face of the pin toward a proximal end of the pin and having an open end adjacent to the distal end of the pin that allows the locking portion to enter the longitudinal groove, and
a lateral groove extending from a part of the longitudinal groove that is adjacent to the proximal end of the pin and extending in a circumferential direction of the pin.

13. The steering wheel according to claim 12,
wherein the locking portion is a locking bar extending across the diameter of the ring portion,
wherein the longitudinal groove extends in a diametrical direction of the distal end face of the pin, and
wherein the lateral groove is located on each of a first half of a first side of the longitudinal groove and a second half of a second side thereof in the diametrical direction.

14. The steering wheel according to claim 13, wherein the force component applying portion is located in each of a portion of the distal end face of the pin that extends along the first half of the first side of the longitudinal groove in the diametrical direction and a portion of the distal end face of the pin that extends along the second half of the second side thereof.

15. The steering wheel according to claim 13, wherein the pin has an axis aligned with that of the ring portion.

16. The steering wheel according to claim 12,
wherein the locking portion has an edge extending on the chord of the ring portion, and
wherein the longitudinal groove is shaped by cutting away a part of the distal end face at the chord.

17. The steering wheel according to claim 16, wherein the force component applying portion extends entirely along the longitudinal groove in the diametrical direction in the distal end face of the pin.

18. The steering wheel according to claim 16, wherein the pin has an axis offset from that of the ring portion.

19. A steering wheel including a steering wheel body, an airbag-device mounting portion included in the steering wheel body, and an airbag device having a rear surface facing toward the airbag-device mounting portion and mounted on the airbag-device mounting portion, the steering wheel comprising:
a pin protruding from the rear surface of the airbag device;
an engaging portion located adjacent to a distal end of the pin;
an insertion hole located in the airbag-device mounting portion, the insertion hole receiving the pin; and
a locking member located in the airbag-device mounting portion, the locking member including a locking portion in engagement with the engaging portion of the pin received in the insertion hole,
wherein rotation of the locking member along a circumference of the insertion hole causes the locking portion to engage with the engaging portion of the pin,
wherein the locking member has
a rotatable plate,
a central hole in the plate, and
at least one slot extending radially from the central hole,
wherein the pin includes a small-diameter portion located adjacent to the distal end, and at least one protrusion on a circumferential surface of the small-diameter portion, wherein the force component applying portion is located in at least one of a radially extending wall surface of the slot and a tip of the protrusion, and wherein the small-diameter portion passes through the central hole, the protrusion passes through the slot, and the protrusion engages with an edge of the central hole, wherein the at least one slot comprises a plurality of slots spaced apart in the circumferential direction, the at least one protrusion comprises a plurality of protrusions spaced apart in the circumferential direction, and the plurality of slots are equal in number to the plurality of protrusions, and, wherein the holder includes a peripheral wall surrounding the locking member and the peripheral wall includes a projection attached to the bush.

20. The steering wheel according to claim 19, wherein the locking member includes a lug protruding radially and outwardly beyond the peripheral wall.

21. A steering wheel including a steering wheel body, an airbag-device mounting portion included in the steering wheel body, and an airbag device having a rear surface facing toward the airbag-device mounting portion and mounted on the airbag-device mounting portion, the steering wheel comprising:

a pin protruding from the rear surface of the airbag device;

an engaging portion located adjacent to a distal end of the pin;

an insertion hole located in the airbag-device mounting portion, the insertion hole receiving the pin; and a locking member located in the airbag-device mounting portion, the locking member including a locking portion in engagement with the engaging portion of the pin received in the insertion hole, wherein rotation of the locking member along a circumference of the insertion hole causes the locking portion to engage with the engaging portion of the pin, a holder holding the locking member such that the locking member is rotatable about an axis of the locking member, and, wherein the urging member is disposed between an inner circumferential surface of the peripheral wall and an outer circumferential surface of the locking member.

* * * * *